United States Patent
Körner et al.

(10) Patent No.: US 11,226,622 B2
(45) Date of Patent: Jan. 18, 2022

(54) SYSTEM AND METHOD FOR ANALYZING DRIVING TRAJECTORIES FOR A ROUTE SECTION

(71) Applicant: Continental Automotive GmbH, Hannover (DE)

(72) Inventors: Rene Alexander Körner, Munich (DE); Henning Hamer, Munich (DE); Claudia Loy, Munich (DE); Steen Kristensen, Lindenberg im Allgäu (DE); Bastian Zydek, Bad Soden (DE)

(73) Assignee: Continental Automotive GmbH

( * ) Notice: Subject to any disclaimer, the term of this patent is extended or adjusted under 35 U.S.C. 154(b) by 22 days.

(21) Appl. No.: 16/329,477

(22) PCT Filed: Aug. 10, 2017

(86) PCT No.: PCT/EP2017/070332
§ 371 (c)(1),
(2) Date: Feb. 28, 2019

(87) PCT Pub. No.: WO2018/041591
PCT Pub. Date: Mar. 8, 2018

(65) Prior Publication Data
US 2019/0196472 A1 Jun. 27, 2019

(30) Foreign Application Priority Data
Aug. 30, 2016 (DE) .................. 10 2016 216 335.3

(51) Int. Cl.
*G05D 1/00* (2006.01)
*G05D 1/02* (2020.01)
*G01C 21/32* (2006.01)

(52) U.S. Cl.
CPC ........... *G05D 1/0088* (2013.01); *G01C 21/32* (2013.01); *G05D 1/0214* (2013.01); *G05D 2201/0213* (2013.01)

(58) Field of Classification Search
CPC ............. G05D 1/0088; G05D 1/0214; G05D 2201/0213; G01C 21/32
See application file for complete search history.

(56) References Cited

U.S. PATENT DOCUMENTS 5,467,284 A * 11/1995 Yoshioka ............. G05D 1/0257
701/301
5,938,707 A * 8/1999 Uehara ................. G05D 1/0261
180/167

(Continued)

FOREIGN PATENT DOCUMENTS

DE 102013013867 A1 3/2015
DE 102014018192 A1 6/2015

(Continued)

OTHER PUBLICATIONS

International Search Report and Written Opinion dated Dec. 6, 2017 from corresponding International Patent Application No. PCT/EP2017/070332.

*Primary Examiner* — Mussa A Shaawat

(57) ABSTRACT

A system for generating at least a second trajectory for a first route section of a road comprises a first interface for receiving first data representing at least a first trajectory. The first data were recorded during travel on the first route section by at least one vehicle controlled by a human driver. The first interface is additionally configured to receive second data representing ambient conditions at the time of recording of the first trajectory, and to receive third data representing vehicle-related features present during the recording of the first trajectory. The system additionally comprises a first data processing module that performs (Continued)

clustering of multiple first trajectories based on associated second data and/or third data, a database for retrievably storing the results of the clustering, and a second interface for receiving a request for the transmission of a second trajectory and for corresponding transmission of the requested second trajectory.

9 Claims, 3 Drawing Sheets

(56) References Cited

U.S. PATENT DOCUMENTS

| | | | | |
|---|---|---|---|---|
| 6,169,940 | B1* | 1/2001 | Jitsukata | B62D 1/28 340/903 |
| 6,963,795 | B2* | 11/2005 | Haissig | G08G 5/0008 342/104 |
| 7,224,309 | B2* | 5/2007 | Shimomura | G01S 13/931 342/70 |
| 7,617,037 | B2* | 11/2009 | Desens | B62D 15/026 701/96 |
| 8,880,272 | B1* | 11/2014 | Ferguson | G08G 1/096725 701/26 |
| 9,274,525 | B1* | 3/2016 | Ferguson | B60W 10/20 |
| 10,589,738 | B1* | 3/2020 | Boecker | B60T 8/17616 |
| 2010/0256836 | A1* | 10/2010 | Mudalige | G08G 1/164 701/2 |
| 2014/0088855 | A1* | 3/2014 | Ferguson | G08G 1/166 701/117 |
| 2014/0244125 | A1 | 8/2014 | Dorum et al. | |
| 2016/0026182 | A1 | 1/2016 | Boroditsky et al. | |
| 2016/0223350 | A1* | 8/2016 | Lewis | G05D 1/0278 |
| 2017/0120803 | A1* | 5/2017 | Kentley | B60W 10/18 |
| 2017/0120804 | A1* | 5/2017 | Kentley | B60W 30/08 |
| 2017/0120814 | A1* | 5/2017 | Kentley | B60C 5/008 |
| 2017/0120902 | A1* | 5/2017 | Kentley | B60W 10/04 |
| 2017/0167881 | A1* | 6/2017 | Rander | G05D 1/0214 |
| 2017/0297568 | A1* | 10/2017 | Kentley | G09G 5/363 |
| 2020/0256682 | A1* | 8/2020 | Gonsa | G06K 9/00791 |
| 2020/0309538 | A1* | 10/2020 | Gonsa | G06F 16/29 |
| 2021/0012648 | A1* | 1/2021 | Korner | G06N 7/005 |

FOREIGN PATENT DOCUMENTS

| | | |
|---|---|---|
| DE | 102015014651 A1 | 5/2017 |
| WO | 2010/147730 A1 | 12/2010 |
| WO | 2014/174001 A1 | 10/2014 |

* cited by examiner

SYSTEM AND METHOD FOR ANALYZING DRIVING TRAJECTORIES FOR A ROUTE SECTION

BACKGROUND

Technical Field

The present invention relates to the analysis of driving trajectories, in particular for the generation of predefined trajectories, for example for autonomously driving vehicles, and for the detection of changes in road or roadway characteristics of the section of road.

Prior Art

Autonomously driving vehicles use digital road maps to plan the routes they travel. Each actual road situation present at a location is recorded by means of different sensors and converted into appropriate steering movements. The conversion of an encountered road situation recorded by means of sensors can lead to a driving trajectory that differs significantly from a driving trajectory traveled on by a human driver in the same situation. In particular, human-driver-controlled and autonomous vehicles can differ greatly in speed and the intensity of steering movements, such as when an autonomous vehicle always travels in the middle of a lane, while a human driver is usually more likely to attempt to follow some sort of "ideal line". The driving trajectory traveled on by the autonomously driving vehicle can be perceived by human road users as unnatural or even threatening, which can lead to misjudgments on the part of human road users with corresponding consequences, or at least can promote a negative attitude towards autonomously driving vehicles.

WO 2014/174001 A1 discloses the recording of the actual paths of travel of multiple vehicles driven by human drivers and the determination of a vehicle course representative of the average driver. This average vehicle course is made available to driver assistance systems so as, for example in intersection areas, to allow probable vehicle courses of other vehicles to be taken into consideration for their own driving trajectory in advance and thus to allow collisions to be avoided.

BRIEF SUMMARY

It is an object of the present system to use a multiplicity of first trajectories that were recorded for different ambient conditions, vehicle, passenger or driver characteristics and/or driving styles during travel on a route section by human-driver-controlled vehicles to produce corresponding second trajectories for the route section.

In the context of this description, a first trajectory corresponds to a series of waypoints at which a vehicle was actually on a roadway or road at a time. Each waypoint can be explicitly determined for example by relative coordinates, e.g. represented by a vector describing a distance and a direction of the respective waypoint with respect to a roadside or a marking on or at the roadway or road, or to another explicitly locatable reference point. For example an imaging sensor of the vehicle can be used for this type of position determination, for example a camera or a scanning lidar system. Detection of road markings can be effected e.g. by detecting color differences between the road surface and the marking, or by detecting different surface structures. The description of the detected markings can be provided by appropriate features or parameters suitable for relative positioning. However, determination of waypoints on a first trajectory can also be effected by determining absolute coordinates, such as those provided by a satellite navigation system, for example. Other systems and methods for determining a position can likewise be used, for example position determination by recording acceleration and deceleration over time, sensing the steering angle, speed, or combinations of different methods for increasing accuracy. Non-continuous recording of the waypoints can result in a trajectory being approximated by connecting the waypoints, for example by curves or spline-like lines following a polynomial function. A first trajectory can have a beginning and an end; however, a certain length is not mandatory.

Multiple first trajectories on the same route section for the same lane and the same direction of travel are repeatedly recorded for the route section by a multiplicity of vehicles over a period of time or without a time limit and transmitted from the vehicles to a data processing unit. Multiple first trajectories on the same route section form a set of first trajectories, from which second trajectories are determined, possibly specifically for further features of the route section, of a vehicle, of a driving style, of specific ambient conditions or the like. A set of first trajectories can also be referred to by a corresponding "driving envelope" that includes all or selected first trajectories in the set of first trajectories on a route section.

For each first trajectory, values for characterizing features can be calculated, e.g. a mean or median position, a standard deviation of a position of a waypoint from a corresponding waypoint of a mean trajectory in a set of first trajectories. It is also possible to determine a mean or median speed at a waypoint and corresponding statistical values with respect to individual trajectories in a set of first trajectories.

Each newly recorded first trajectory can be set with respect to and compared with a driving envelope formed from previously recorded first trajectories or a trajectory determined to be representative. Extreme values can be disregarded by applying appropriately selected threshold values.

By analyzing the first trajectories, it is possible to infer a vehicle type used during the recording, or to recognize danger spots or changes in properties of the route section.

The detection of a vehicle type used in the detection, e.g. cars, trucks, vehicles with or without trailers, motorcycles, etc., can be effected using speed or acceleration profiles, curve radii and gradients along a route section, for example, which can be specific to each vehicle type. For this purpose, a speed and/or acceleration along or around one or more of the axes of the three-dimensional space can be recorded for each waypoint next to the position of the vehicle. The identification of a vehicle type can be particularly simple for certain driving maneuvers. For example, a first trajectory can indicate that an overtaking maneuver has been performed or a lane has been changed. Curve radii and accelerations in the case of such and other driving maneuvers differ sufficiently for different vehicle types to allow association. The association of first trajectories with vehicle types can be taken into account accordingly during clustering and makes it possible to provide a suitable second trajectory for corresponding enquiries for a particular vehicle type. It is thus possible, for example, to respond to an enquiry from a driver of a truck with a second trajectory based on first trajectories recorded by trucks. The vehicle type can also be transmitted by the vehicle itself together with the first trajectory.

In an aspect with a more extensive analysis of the first trajectories, ambient conditions are taken into consideration at the time of recording. These ambient conditions include weather conditions such as, for example, temperature, air pressure, precipitation, or fog, but also brightness, time of day, season, and the like, inter alia. The ambient conditions can be recorded by sensors arranged in the vehicle or arranged in situ at the route section and transmitted to the system. However, data representing ambient conditions can also be obtained from a weather database, with for example an indication of the geographical location of the section of road enabling a correspondingly well-defined selection of the data pertaining to ambient conditions.

In an aspect with a more extensive analysis of the first trajectories, characteristics of a driver who has driven a vehicle during recording of the trajectory are transmitted to the system, for example the age of the driver, driving experience, and the like. To protect privacy, the information can be recorded by indicating an affiliation to a corresponding group or class. This aspect makes it possible to transmit second trajectories matched to the driver or a passenger of an autonomously driving vehicle that were determined from first trajectories recorded by vehicles driven by drivers with similar characteristics. For example, for a passenger of an autonomously driving vehicle who has limited vision, a particularly uniform second trajectory can be provided which does not require abrupt or surprising steering movements. Thus, the passenger can always adjust to the upcoming driving situation despite limited vision.

Changes in characteristics of the route section, for example a newly created damaged area in the road surface or a blockage in a part or in the entire roadway, can likewise be detected by the analysis of the first trajectories. Such changes are often accompanied by abrupt braking processes, accelerations, steering movements, lane changes or the like, which did not occur in the previously recorded first trajectories for an applicable route section. If trajectories deviating from a mean trajectory, which are possibly even similar to one another in their deviation, are transmitted to the system for a section of road by different vehicles within a short period of time, it can be assumed that there is a change in the characteristics of the route section. The system can then, for example, send an appropriate report to a road maintenance company, which carries out a check and, if necessary, corrects a disruptive change on the roadway or a lane of the route section. It is even possible for an end of a traffic jam to be detected and if need be forwarded to radio stations and realtime traffic services to inform other road users.

The detection of danger spots is effected, for example, by means of an analysis of the driving envelopes of adjacent lanes of a route section for one or both directions of travel. If a larger number of first trajectories in two lanes that are not physically separate are close to one another or even touch or intersect, this can be accompanied by a higher probability of accident. Corresponding areas of a route section can be identified and used, for example, to improve digital road maps or to display warnings in communicatively networked navigation systems, e.g. in eHorizon systems.

The first trajectories can be used, in accordance with features indicated in an enquiry in this respect, and if need be currently available ambient conditions, to determine individual second trajectories that meet individual requirements. The second trajectories individually generated using the present system and according to the present method can be used, for example, for controlling an autonomously driving vehicle along sections of road, for example to make the driving experience for the vehicle occupants or the driving behavior for other road users seem less "robotic". It thus happens, for example, that drivers of vehicles in adverse visibility conditions drive through larger curve radii before curves or drive closer to the opposite roadway before entering a curve, in order to be able to see the course of the road better. An autonomous vehicle controlled based on a trajectory generated by the present system would be perceived as a threatening robot driver less by other road users.

General use in driver assistance systems is also possible, for example to improve safety or comfort, but also to improve the availability of driver assistance systems and to reduce the computation complexity required in a vehicle when implementing driver assistance systems.

Thus, driver assistance systems such as a lane departure warning system, which currently only steer a vehicle back to the center of a lane based on geometric information for the roadway and applicable sensor information, can use second trajectories relating to the present system to intervene in the vehicle steering such that the vehicle is steered back to an optimum trajectory each time in any route section. A lane change recommendation, e.g. by a navigation system, can also be provided at a particularly suitable location based on trajectories provided for a route section by the system, rather than being determined only by a distance to a turn ahead. Likewise, in situations where vehicle sensors do not provide useful data for a driver assistance system, for example in the absence of a roadway marking, it is still possible for assisted or autonomous driving to be accomplished by means of trajectories provided by the system.

BRIEF DESCRIPTION OF THE DRAWINGS

The invention will be explained below with reference to the drawing and on the basis of exemplary embodiments. In the drawing.

DETAILED DESCRIPTION

Figure 1:
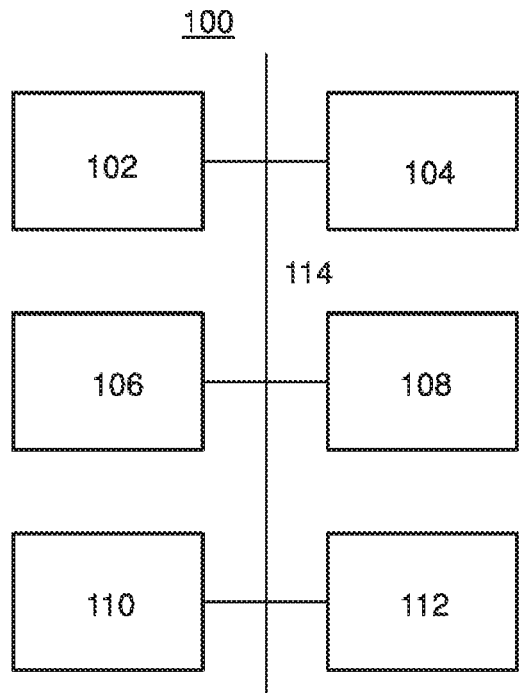
FIG. 1 shows a greatly simplified exemplary block diagram of a vehicle-external part 100 of the system according to the invention.

In the figures of the drawing, identical or similar elements are provided with the same reference signs.

FIG. 1 shows a greatly simplified exemplary block diagram of a vehicle-external part 100 of the system according to the invention. The system 100 for generating at least a second trajectory for a first route section of a road comprises a first interface 102 for receiving first data representing at least a first trajectory. The first data comprise corresponding first data records, wherein a respective first data record was recorded during travel on the first route section by at least one vehicle controlled by a human driver.

The first interface 102 is additionally configured to receive second data representing ambient conditions at the time of recording of the first trajectory.

The first interface 102 is furthermore configured to receive third data representing vehicle-related features present during the recording of the trajectory. These vehicle-related features can comprise movements and accelerations of the vehicle or of vehicle components around and/or along a longitudinal, transverse and/or vertical axis, but also a vehicle type used in the recording of the first trajectory and/or the driver who has driven the vehicle during the recording of the first trajectory, or his driving style, special characteristics of a cargo or of passengers of the vehicle, or the like, inter alia.

The system 100 additionally comprises a first data processing module 104 that performs clustering of multiple first trajectories based on associated second data and/or third data. Results of the clustering, for example a representative trajectory for each cluster, are retrievably stored in a database 106 of the system. The representative trajectory can be, for example, a mean trajectory over all trajectories of a cluster, or a median trajectory, which is determined, for example, by determining the respective median values of applicable sections of the trajectories of a cluster. In addition to waypoints for respective subsections, a trajectory can also include information about a speed and/or acceleration for each or a group of waypoints.

A second interface 108 of the system 100 receives requests to transmit a second trajectory. The requests include, in addition to data enabling identification of the route section, at least one feature corresponding to second and/or third data. For example, it is thus possible to specify in a request a specific vehicle type, specific weather conditions or a desired driving style. However, it is also possible for current ambient conditions on the route section to be automatically taken into consideration by the system 100 for the selection of the second trajectory, for example according to an applicable query, the timing of which is associated with the request, to a weather database (not shown in the figure) or to ambient sensors (not shown in the figure) arranged on the route section using the first interface 102.

The first and second interfaces 102, 108 can be formed by one or more logical and/or physical data connections to respective sources of the first, second and third data, respectively, or to a vehicle transmitting an enquiry. The data connections can conform to different wired or wireless standards for data communication, for example according to one of the known telecommunication standards GSM (Global System for Mobile Communications), UMTS (Universal Mobile Telecommunication System), GPRS (General Packet Radio Service), C2C (Car-toCar Communication), C2I (Car-to-Infrastructure Communication), LTE (Long Term Evolution), or the like.

According to one aspect, the data processing module 104 of the system 100 has a filter function implemented in it that disregards at least those segments of first trajectories for the first route section that have a certain deviation from corresponding segments of a mean first trajectory or admits those segments of first trajectories having a weighting factor that decreases as the deviation from a mean first trajectory for the applicable segment increases to a more extensive analysis. This makes it possible to disregard deviations from a standard trajectory that have become necessary due to emergency situations, for example. The deviation from the mean first trajectory can be determined for example laterally with respect to a roadway or lane of the first route section and/or longitudinally with respect to an instantaneous speed at a location on the first route section.

According to one aspect, the system 100 has a second data processing module 110 that analyzes second trajectories of multiple roadways of the first route section for their lateral distance and, if the distance is below a minimum distance, accordingly marks this route section as a danger zone. The lateral distance describes the distance of trajectories substantially at a right angle to the trajectory. The second trajectories can be selected according to second and/or third data, so that trajectories for certain ambient conditions and vehicle-related features can be analyzed for their lateral distance. This makes it possible to identify danger zones individually for each request for a second trajectory. The marking as a danger zone can be effected for a digital road map and visualized accordingly.

Thus, for example a driver who prefers a sporty driving style can be individually advised of a danger zone and the necessary increased attention there. For this purpose, the vehicle can retrieve an applicable second trajectory for a route section ahead and receives, together with the trajectory, an indication that a segment of the route section was determined to be a danger zone for a "sporty driving style". This section can be highlighted on a display, for example, thereby asking the driver to pay special attention. Alternatively or additionally, an audible warning can be provided.

In another example of this aspect of the system 100, a vehicle is driving autonomously, with the passenger having selected "sporty driving style". The vehicle retrieves an applicable second trajectory for a "sporty driving style" for a route section ahead from the system 100 and receives, together with the trajectory, an indication that a segment of the route section ahead was determined to be a danger zone for "sporty driving style". Accordingly, the vehicle retrieves a trajectory for a less dangerous driving style for this segment, or automatically adjusts the driving style within this segment.

In yet another example of this aspect of the system 100, a vehicle is driving "semi-autonomously", the passenger having selected "sporty driving style". The vehicle retrieves an applicable second trajectory for a "sporty driving style" for a route section ahead from the system 100 and receives, together with the trajectory, an indication that a segment of the route section ahead was determined to be a danger zone for "sporty driving style". When approaching the danger area, the passenger is asked to pay special attention in order to be able to take the wheel himself if necessary.

In order to select a second trajectory in response to a request, one aspect involves there being provision for a third data processing module (not shown in the figure). In this case, the third data processing module retrieves the second trajectory from applicable clusters of the database (106) in accordance with information that the enquiry contains about a vehicle type and/or about features that characterize a passenger of an autonomously driving vehicle.

In the examples above, the term "sporty driving style" can be replaced by other characteristics that can be represented by second or third data, e.g. by ambient conditions or the like.

According to one aspect, the system 100 has a fourth data processing module 112 that determines a likelihood of an obstacle at least temporarily present in the first route section for at least one vehicle type from first, second and third data received within a first period of time.

In this aspect, it is inferred from a series of first trajectories, transmitted to the system 100 within a first period of time, that similarly deviate from a mean trajectory previously determined for a route section that there is an obstacle at the location of the deviation. If second and/or third data are likewise evaluated, the nature of the obstacle can be inferred. It is thus possible, for example, to infer a seasonal obstacle from date information transmitted with the trajectories, for example shrubs or trees at the roadside that have a lot of foliage during spring and summer and that make a curve difficult to see. A "mean trajectory" can accordingly be matched to a season. If the trees or shrubs were cut back in the meantime, this would be conspicuous in the analysis of newly received first trajectories and can accordingly be taken into account in subsequent requests for the transmission of second trajectories. If additionally information is also available on a vehicle type, such adverse effects can be taken into account even more specifically. For example, a hanging branch of a tree can present a visual obstruction for a driver sitting high in a truck or there is the risk of collision with parts of the truck's superstructure, forcing it into an evasive trajectory, while a car driver would not be affected and accordingly no change in the trajectory is required. Even temporary adverse effects due to roadworks can be recognized and taken into account when determining the second trajectories. In particular temporarily narrowed lanes can then result in a second trajectory, selected with safety aspects in mind, being provided. The evaluation of such information can then be used, when a trajectory is requested, to select one that is best suited in each case, but also to trigger appropriate measures on the route to eliminate the adverse effect.

A component of the vehicle-external part of the system 100 can be formed by one or more computers configured by appropriate computer programs for performing the respective task of a system component. The components of the system 100 are communicatively connected to one another by means of one or more bus systems 114.

Figure 2:
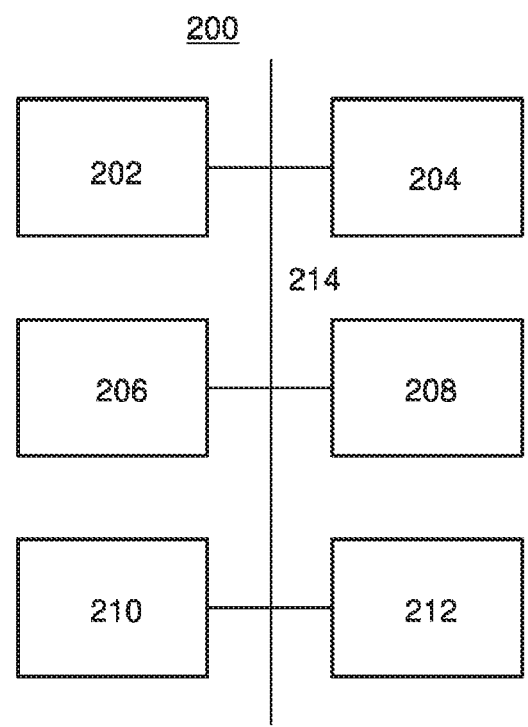
FIG. 2 shows a greatly simplified exemplary block diagram of an on-vehicle part of the system according to the invention.

FIG. 2 shows a greatly simplified exemplary block diagram of an on-vehicle part 200 of the system according to the invention. A vehicle, not shown in the figure, which is configured for recording trajectories for use in the present system, has sensors 202 or another suitable apparatus for periodic or continuous position determination, for example a satellite navigation system or an apparatus for determining a position from a digital road map taking into account acceleration, speed and/or steering angle data. Apparatuses that perform position determination by comparing a digital representation of vehicle surroundings or reference images with a representation of the vehicle surroundings captured by imaging sensors can also be used, for example radar, lidar, cameras and/or ultrasonic sensors, or a combination of these. The comparison can be made to reduce the required computing power and to speed up the process based on reference objects extracted from the digital representation or the reference images, wherein the representation captured by the imaging sensors can likewise be reduced or simplified accordingly. Relatively accurate determination of the position of the vehicle within a lane can be effected in a simple manner by means of imaging sensors in this case, for example with reference to features of the roadway or lane that are fundamentally invariable or change only slowly over time, such as roadway markings or the like. A series of positions or waypoints of the vehicle at successive times represent respective trajectories for a route section that are sent to the vehicle-external part 100 of the system.

The vehicle additionally has sensors 204 that record ambient conditions and condition and provide them as second data for transmission to the vehicle-external part of the system. These ambient conditions include, but are not limited to, weather conditions such as, for example, temperature, air pressure, precipitation, fog, brightness, time of day, season, and the like.

Third data can be generated or recorded by the vehicle according to applicable user inputs, settings and/or defaults, or in response to sensors that record movements and accelerations of the vehicle or vehicle components around and/or along a longitudinal, transverse and/or vertical axis.

The vehicle additionally has an interface 206 that is configured for communication with the first interface 102 of the vehicle-external part 100 of the system and conforms to appropriate communication standards. During communication with the vehicle-external part 100 of the system, data representing trajectories of the vehicle and associated second data and/or associated third data are transmitted.

When the vehicle not only serves as a data source for the vehicle-external part 100 of the system, but also requests a trajectory from the vehicle-external part 100 of the system, for example in an autonomous driving mode, the vehicle has a further interface 208 that is configured for communication with the second interface 108 of the vehicle-external part 100 of the system and conforms to appropriate communication standards. During communication with the vehicle-external part 100 of the system, a trajectory for a route section for the vehicle is requested, the corresponding enquiry being used to transmit second data and/or third data for specifying the enquiry to the vehicle-external part 100 of the system.

The vehicle uses the further interface 208 to receive data corresponding to the enquiry that describe a trajectory for the route section. These data can be displayed to a driver of the vehicle for information, or can be supplied to the applicable controllers 210 and actuators 212 for control of the vehicle, for example for adjusting a steering angle, a speed, and the like. In this case, the sensors 202 of the vehicle can record its position and surroundings and supply appropriate data to one or more controllers 210, which generate suitable control values therefrom so that it is possible to travel on the received trajectory on the route section encountered taking into account vehicle, weather and/or traffic conditions.

In one aspect, the vehicle-external part 100 of the system provides not only a trajectory for a requested direction of travel of a route section, but also one or more trajectories for one or more adjacent lanes for the same direction of travel and/or the opposite direction. These trajectories can, for example, be trajectories occurring with a certain frequency that are closer than an average trajectory to the trajectory for the vehicle's own direction of travel. If two trajectories approach one another in a part of the route section and come within a certain minimum distance, this can be indicated to the driver of the vehicle as a danger area. Danger areas can also be indicated on the basis of the current traffic situation. For example, indication of the danger area can be dispensed with without oncoming traffic. In this case, the traffic situation can be delivered as a typical traffic situation for a current time by the vehicle-external part 100 of the system together with the trajectory or can actually be recorded by means of sensors or communication means of the vehicle. In an autonomously driving vehicle, the trajectories for the lanes adjacent to the vehicle's own lane can be taken into account as appropriate during control, for example by temporarily adapting a selected driving style or the like. This aspect allows a driver or a system for autonomous vehicle control to match the driving style to an expected driving style of non-autonomous vehicles traveling on the same route section in advance without having to observe the traffic situation or the other road users and estimate their likely trajectory in complex fashion. Accidents involving autonomously driving vehicles and vehicles driven by human drivers could therefore be avoided more easily.

A component of the on-vehicle part 200 of the system can be formed by one or more computers or controllers configured by appropriate computer programs for performing the respective task of a system component. The components of the system 200 are communicatively connected to one another by means of one or more bus systems 214.

Figure 3:
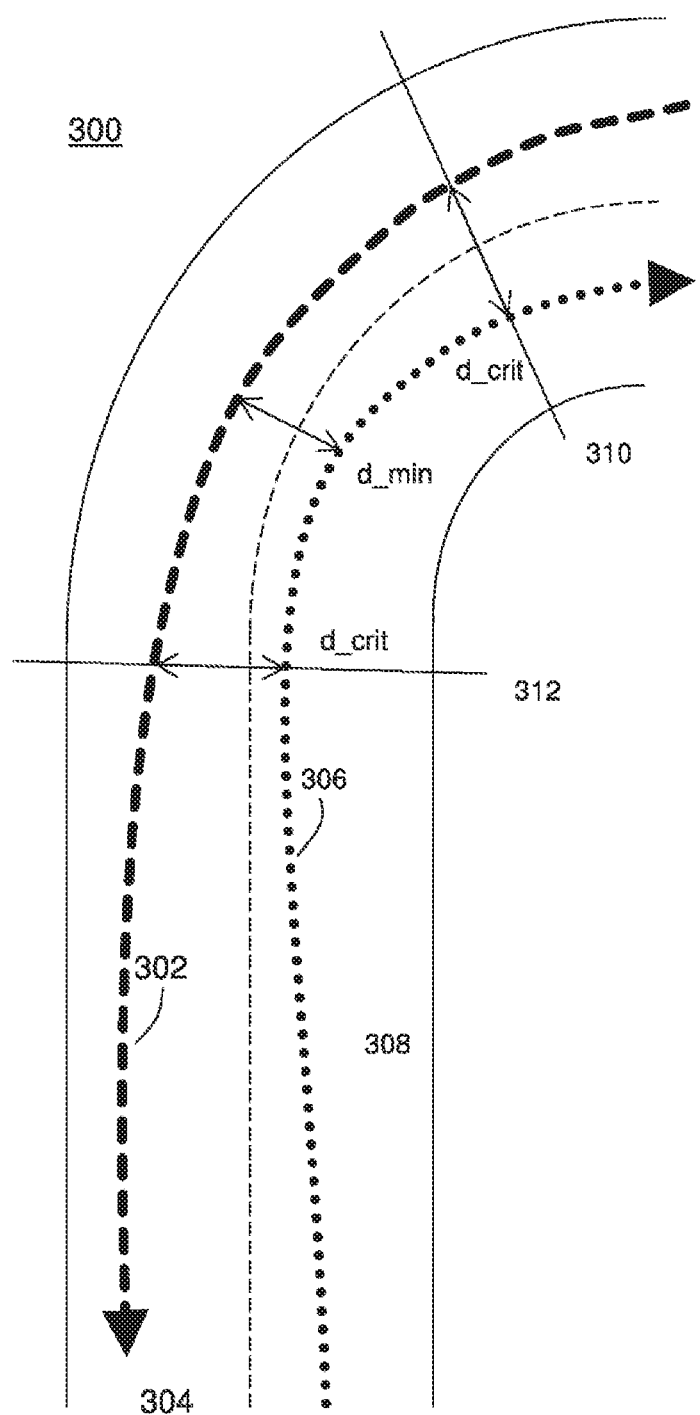
FIG. 3 shows an exemplary schematic depiction of trajectories along a route section.

FIG. 3 shows an exemplary schematic depiction of trajectories along a route section 300. The route section 300 shows a road having one roadway for each direction of travel. The road has a 90-degree curve. A first trajectory 302 represents a typical path of travel for vehicles in the outside lane 304 of the curve. It can clearly be seen that the typical path of travel does not always run in the middle of the lane 304, but rather runs at different distances between the outer edge of the roadway and the center line separating the two directional roadways. The same can be seen for a second trajectory 306 representing a typical path of travel for vehicles in the inside lane 308 of the curve. In particular between the markings 310 and 312, the distance between the first trajectory 302 and the second trajectory 306 is less than a first critical distance d_crit, there being a minimum distance d_min at a point between the two markings 310 and 312. A driver information system could highlight the area between the markings 210 and 312 and thereby identify it as a danger area, so that a driver can adapt his path of travel accordingly. In the case of an autonomously driving vehicle, the vehicle could choose a path of travel that is further from the center line within the area between the markings 310 and 312. In both cases, the speed may additionally need to be reduced.

Figure 4:
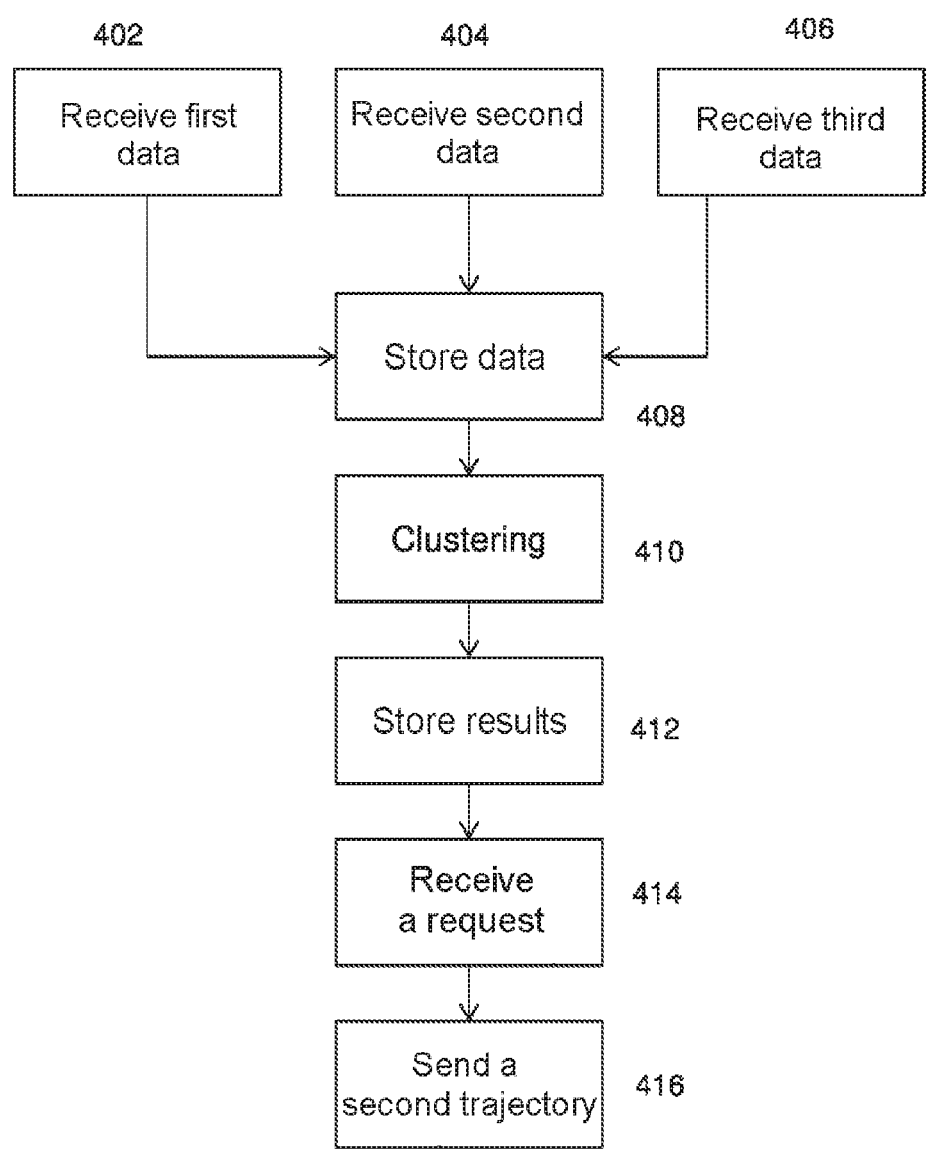
FIG. 4 shows a simplified flowchart of a method carried out on a vehicle-external part of the system according to the invention.

FIG. 4 shows a simplified flowchart of a method carried out on a vehicle-external part of the system according to the invention. In steps 402, 404 and 406, first, second and third data, respectively, are received, representing characteristics and/or further features of trajectories on sections of road recorded when travelling on the respective route sections with vehicles driven by human drivers. The received data are stored in step 408. The first, second and third data can be received synchronously, but also each independently of one another at respective times. The stored data are subjected to clustering in step 410, the results of which are retrievably stored in step 412. In step 414, a request is received in which a trajectory for a route section is requested, possibly for a vehicle type or driving style or in accordance with another feature or another criterion. In response to the request, a trajectory corresponding to the features of the request or coming closest to the requests is sent in step 416.

The invention claimed is:

1. A system for generating at least a second trajectory for a first route section of a road, comprising:
   a first interface for receiving first data, which represent at least a first trajectory, wherein the first data were recorded during travel on the first route section by at least one vehicle controlled by a human driver, for receiving second data representing ambient conditions at the time of recording of the first trajectory, and for receiving third data representing vehicle-related features present during the recording of the first trajectory,
   a first data processing module, which performs clustering of multiple first trajectories based on the second data and/or the third data,
   a database for retrievably storing the results of the clustering, and
   a second interface for receiving a request for the transmission of a second trajectory and for the corresponding transmission of the requested second trajectory; and
   wherein the system comprises a second data processing module that analyzes trajectories on a first lane, with traffic in a first direction, and on a second lane, with traffic in a direction opposite to the first direction, of the first route section for their lateral distance, taking into consideration the second data and the third data and, when their lateral distance is below a minimum distance, accordingly marks this route section as a danger zone based on their lateral distance being below the minimum distance.

2. The system of claim 1, wherein the first data processing module implements a filter function that disregards those first trajectories for the first route section that have a certain deviation from a mean first trajectory or admits first trajectories having a weighting factor that decreases as the deviation from a mean first trajectory increases to a more extensive analysis.

3. The system of claim 2, wherein the filter function is configured to determine the deviation laterally with respect to a roadway of the first route section and/or longitudinally with respect to an instantaneous speed at a location on the first route section.

4. The system of claim 1, wherein the system has a third data processing module that, in response to an enquiry, retrieves a second trajectory from corresponding clusters of the database, wherein the enquiry includes information about a vehicle type and/or about features that characterize a passenger of an autonomously driving vehicle.

5. The system of claim 1, wherein the system has a fourth data processing module that determines a likelihood of an obstacle at least temporarily present in the first route section for at least one vehicle type from the first data, the second data, and the third data received within a first period of time.

6. The system of claim 1, wherein the second interface is configured to receive a request for transmission containing at least one feature corresponding to second or third data.

7. A method for generating one or more second trajectories for a first route section, comprising:
   receiving first data representing at least a first trajectory, wherein the first data were recorded during travel on the first route section by at least one vehicle controlled by a human driver,
   receiving second data, which represent ambient conditions at the time of recording of the first trajectory,
   receiving third data representing vehicle-related features present during the recording of the first trajectory,
   storing the received first data, the received second data, and the received third data in a database,
   clustering multiple first trajectories based on the second data and/or the third data, and storing the results of the clustering,
   receiving a request for the transmission of a second trajectory and corresponding transmission of the requested second trajectory; and
   analyzing trajectories on a first lane, with traffic in a first direction, and on a second lane, with traffic in a direction opposite to the first direction, of the first route section for their lateral distance, taking into consideration the second data and the third data and, when their lateral distance is below a minimum distance, accordingly marking this route section as a danger zone based on their lateral distance being below the minimum distance.

8. The method of claim 7, wherein the second trajectory is configured for use in controlling an autonomously driving vehicle along the first route section to make the driving experience for the vehicle occupants, or the driving behavior for other road users, seem less robotic.

9. The method of claim 1, wherein the second trajectory is configured for use in controlling an autonomously driving vehicle along the first route section to make the driving experience for the vehicle occupants, or the driving behavior for other road users, seem less robotic.

* * * * *